United States Patent [19]

Murata

[11] 4,128,797

[45] Dec. 5, 1978

[54] CHAIR FOR DENTAL TREATMENT

[75] Inventor: Hiroshi Murata, Warabi, Japan

[73] Assignee: Daiko Iryoki Seisakusho Co., Ltd., Saitama, Japan

[21] Appl. No.: 820,119

[22] Filed: Jul. 29, 1977

[30] Foreign Application Priority Data

Jun. 11, 1976 [JP] Japan .................................. 51/68502

[51] Int. Cl.$^{2}$ ................................................ G05B 1/06

[52] U.S. Cl. .................................... 318/666; 318/568; 318/561; 318/103; 297/330

[58] Field of Search ................. 318/663, 666, 568, 51, 318/103, 112, 561; 297/330

[56] References Cited

U.S. PATENT DOCUMENTS

| | | | |
|---|---|---|---|
| 3,042,170 | 7/1962 | Tschirf et al. | 318/568 X |
| 3,648,143 | 3/1972 | Harper et al. | 318/568 |
| 3,934,928 | 1/1976 | Johnson | 297/330X |
| 3,984,146 | 10/1976 | Krestel et al. | 297/330 |

FOREIGN PATENT DOCUMENTS

| | | | |
|---|---|---|---|
| 1437015 | 5/1976 | United Kingdom | 297/330 |

*Primary Examiner*—B. Dobeck
*Attorney, Agent, or Firm*—Oblon, Fisher, Spivak, McClelland & Maier

[57] ABSTRACT

A chair for dental treatment having a seat proper with operating mechanisms, comprising power circuits for driving the respective operating mechanisms, position detectors for detecting the movements of the seat proper, a power supply connected to said position detectors, a presetting section connected to the position detectors, memories connected to the respective position detectors, manual control sections connected to the respective power circuits, an automatic control section connected to the power circuits, switch sections provided in the respective power circuits and adapted to close when the respective manual control sections are in operation, memory-reading sections connected to the respective memories, switches provided in the respective power circuits and adapted to close by a momentary operation of the automatic control section and to open by the action of the respective memory-reading sections, and the former switch sections being connected in parallel with said latter switch sections respectively.

1 Claim, 3 Drawing Figures

CHAIR FOR DENTAL TREATMENT

BACKGROUND OF THE INVENTION

The present invention relates to a dental chair or a chair for dental treatment.

A dental chair or a chair for dental treatment is generally provided with three basic operational functions: seat-elevating, seat-tilting and seatback-reclining functions. Among the means for driving the mechanisms which perform the above functions, there is the so-called manual system in which a manual switch provided in each power circuit is kept depressed to operate each mechanism thereby changing the positions of the seat and seat-back according to the patient's constitution or part to be treated. With this system, however, it is necessary to return the seat proper to its original position every time when the patient gargles; therefore, the operation to move the seat proper from the original position to the treating position and vice versa must be repeatedly performed during treatment by operating the manual switch, and in addition the manual switch must be kept depressed until the seat proper reaches a desired position. Thus the use of this manual system results in a very low operational efficiency.

As an improved version of the above system, therefore, there is provided a system which once puts the seat and seat-back at positions suitable for the patient's constitution and part to be treated, and stores these positions in a memory so that the seat proper may be placed at the predetermined position simply by momentarily depressing an "AUTO" button. In the system of this type, the setting part such as a control dial or the like provided externally of the seat proper is set to a predetermined scale value and then the power circuit is energizd to operate for a period corresponding to the scale value set by the above setting part thereby bringing the seat proper to a predetermined position, which is then memorized in a memory if it is suitable for treatment. Thus the above system has an advantage in that it can preset the position of the seat proper; however, it has a disadvantage in that it cannot confirm the position of the seat proper until the seat proper is actually moved, because the seat proper is not moved when the scale value is being preset by the setting part; in other words, the setting part can preset only an approximate value and therefore must perform setting operation repeatedly until the seat proper is brought to a position suitable for treatment.

BRIEF SUMMARY OF THE INVENTION

The present invention contemplates to eliminate the above-mentioned disadvantages of the prior art and to provide a new and novel chair for dental treatment.

Therefore, it is an object of the present invention to provide a chair for dental treatment very easy to handle.

It is another object of the present invention to provide a chair for dental treatment in which presetting of the seat proper can be performed in one simple operation.

It is still another object of the present invention to provide a chair for dental treatment which can move the seat proper between the treating position and the original position automatically.

It is a further object of the present invention to provide a chair for dental treatment which enables comfortable and efficient treatments.

According to the present invention, there is provided a chair for dental treatment having a seat proper with operating mechanisms, comprising power circuits for driving the respective operating mechanisms, position detectors for detecting the movements of the seat proper, a power supply connected to the position detectors, a presetting section connected to the position detectors, memories connected to the respective position detectors, manual control sections connected to the respective power circuits, an automatic control section connected to the power circuits, switch sections provided in the respective power circuits and adapted to close when the respective manual control sections are in operation, memory-reading sections connected to the respective memories, switches provided in the respective power circuits and adapted to close by a momentary operation of the automatic control section and to open by the action of the respective memory-reading sections, and the former switch sections being connected in parallel with the latter switch sections respectively. Accordingly, the seat proper stops moving when the manual control section stops operating, and therefore the optimum treating position of the seat proper can be determined in one operation while being confirmed visually. When the optimum treating position is thus determined, it is detected by the position detector, the output of which is then stored in the memory by operating the presetting section. When the automatic control section is operated with the optimum treating position stored in the memory, the latter switch section is kept closed to operate the power circuit until the switch section is opened by the action of the memory-reading section, and thereby the seat proper is moved to the preset position. In this way, the seat proper can be moved between the starting position and the set position by momentarily operating the automatic control section.

DESCRIPTION OF THE PREFERRED EMBODIMENT

Figure 1:
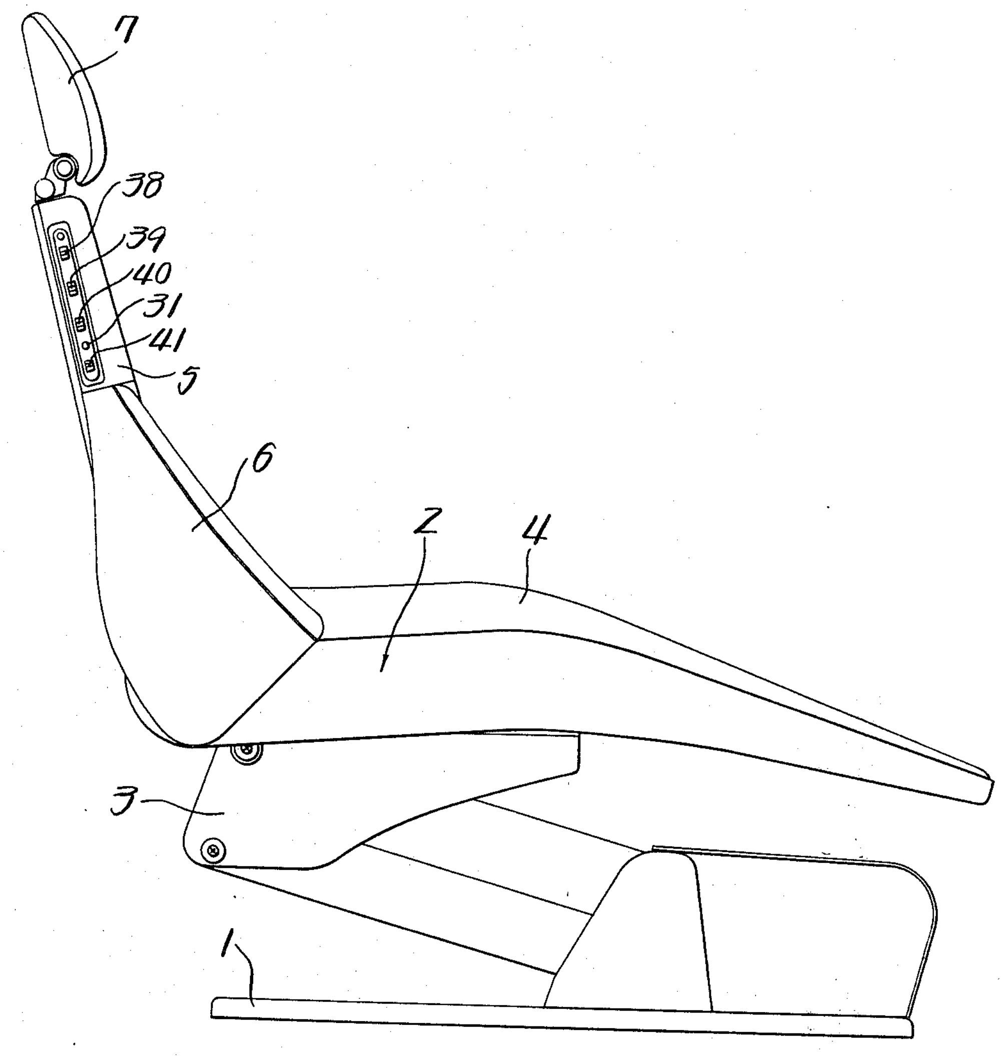
FIG. 1 is a side view of the seat proper of a dental chair according to a preferred embodiment of the present invention.

A preferred embodiment of the present invention will be hereinafter described with reference to the accompanying drawings.

Reference numeral 1 designates a base plate fixed on the floor. On the base plate 1, there is provided a seat proper 2, which consists of a seat support 3, a seat 4 supported by the seat support 3, a seat-back 5 provided at the rear of the seat 4, arm rests 6 provided at both sides of the seat-back 5, and a head rest 7 provided at the top of the seat-back 5 and adapted to move vertically and rotate back and forth; and in addition the seat proper 2 contains therein an elevating mechanism (not shown) for vertically moving the seat support 3 and seat 4, a tilting mechanism (not shown) for tilting the seat 4, and a reclining mechanism (not shown) for reclining the seat-back 5.

Figure 2:
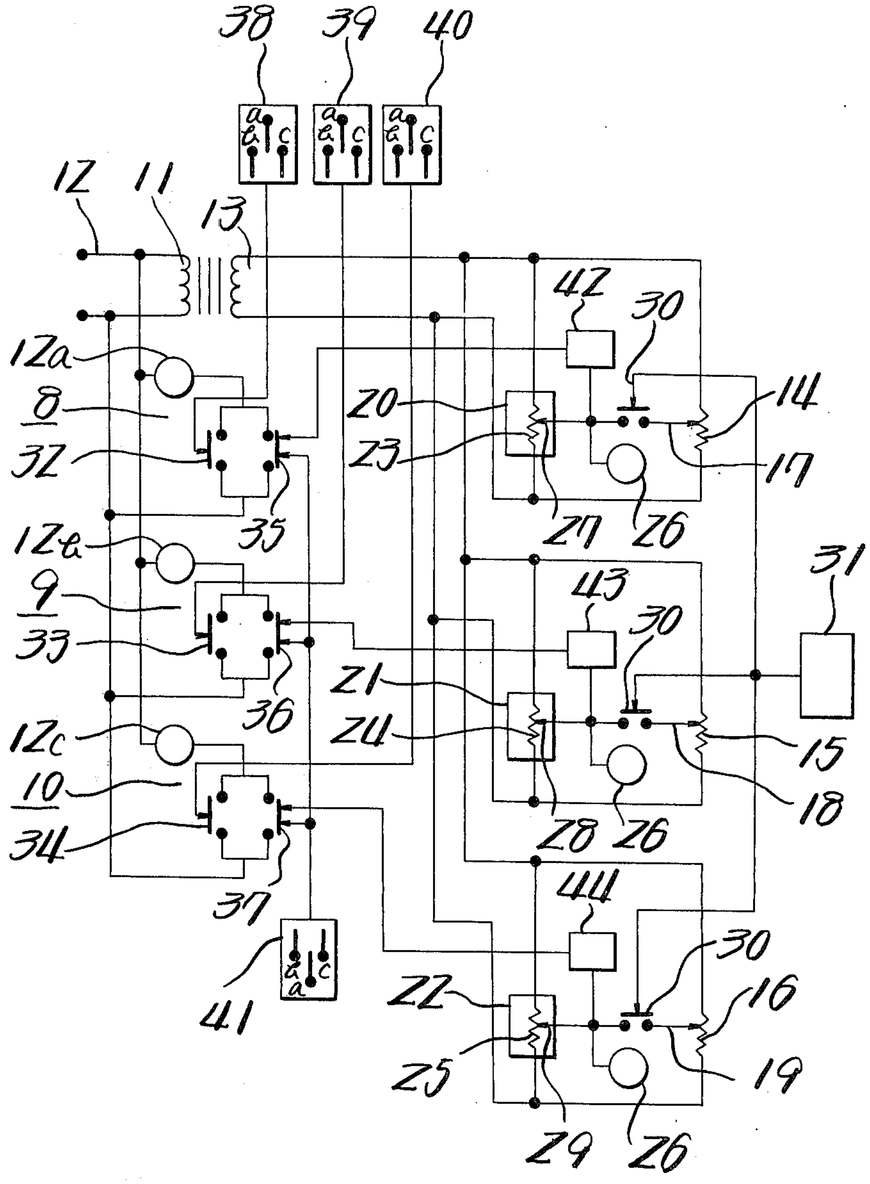
FIG. 2 is a circuit diagram for the seat proper shown in FIG. 1.

As shown in FIG. 2, power circuits 8, 9 and 10 are provided for driving the above-mentioned respective mechanisms independently of each other. These power circuits 8, 9 and 10 are formed, respectively, of motors 12*a*, 12*b* and 12*c* connected to the primary 12 of a transformer 11. Variable resistors 14, 15 and 16, which act as position detectors, are connected to a power supply, i.e., the secondary 13 of the transformer 11, in parallel with each other. These variable resistors 14, 15 and 16 are provided with sliders 17, 18 and 19, respectively. The sliders 17, 18 and 19 are operated in response to the vertical operation of the seat support 3, the tilting operation of the seat 4, and the reclining operation of the seat-back 5, respectively. In addition, these sliders 14, 15 and 16 are provided with an elevation memory 20, a tilting memory 21 and reclining memory 22 corresponding thereto, respectively. These memories 20, 21, and 22 have variable resistors 23, 24 and 25, respectively, which are connected to the above-mentioned secondary 13 of the transformer 11 and which are parallel with the foregoing variable resistors 14, 15 and 16 respectively. These variable resistors 23, 24 and 25 are provided with sliders 27, 28 and 29, respectively, which are driven by linear motors 26. These sliders 27, 28 and 29 are connected to the above-mentioned sliders 17, 18 and 19 through relays 30, respectively. These relays 30 are closed when energized by a presetting section 31.

The power circuits 8, 9 and 10 are provided with switch sections 32, 33 and 34, respectively; and are also provided with switch sections 35, 36 and 37, respectively. The switch sections 32, 33 and 34 are connected in parallel with the switch sections 35, 36 and 37, respectively. The switch sections 32, 33 and 34 are also connected to a manual elevation-control section 38, a manual tilting-control section 39 and a manual reclining-control section 40, respectively. The switch sections 35, 36 and 37 are connected to an automatic control section 41, and also to memory-reading sections 42, 43 and 44 respectively. These memory-reading sections 42, 43 and 44 are connected to the memories 20, 21 and 22, respectively.

If, with the above construction, the manual control sections 38, 39 and 40 are operated with a patient on the seat 4, the switch sections 32, 33 and 34 will be kept closed and thereby the power circuits 8, 9 and 10 will drive the respective operating mechanisms. In other words, the seat support 3 and seat 4 are moved vertically, the seat 4 is tilted and the seat-back 5 are reclined. When the manual control sections 38, 39 and 40 stop operation by releasing the hand therefrom, the switch sections 32, 33 and 34 become open and thereby the seat proper 2 stops moving. At this time, the sliders 17, 18 and 19 move in response to the movement of the seat proper 2, and therefore the position of the seat proper 2 is converted into a voltage and detected by the variable resistors 14, 15 and 16. If, then, the presetting section 31 is operated, the relays 30 will be closed while the linear motors 26 are driven; thus the sliders 27, 28 and 29, provided in the memories 20, 21 and 22 respectively, are operated. In other words, the voltages of the variable resistors 14, 15 and 16 are stored in the elevation memory 20, the tilting memory 21 and the reclining memory 22, respectively. In this manner, presetting of the optimum position for treatment may be carried out while actually confirming the movement of the seat proper 2, and therefore can be performed in one very simple operation. Even if the posture of the seat proper 2 is changed, the contents once preset are kept unchanged until they are changed by re-presetting. The operation to move the seat proper 2 between the treating position and the original position during treatment so that gargling and the like may be made can be performed simply by momentarily manipulating the one automatic control section 41. In other words, instantly when the automatic control section 41 is operated, the switch sections 35, 36 and 37 are closed and thereby the power circuits 8, 9 and 10 drive the respective operating mechanisms; these conditions continue until the switch sections 35, 36 and 37 are opened by the action of the memory-reading sections 42, 43, and 44 which read the contents of the memories 20, 21, and 22 respectively.

In order to move the seat proper 2 between the desired position and the original position, it is necessary to rotate the motors 12*a*, 12*b* and 12*c* both in the forward and reverse directions. The change in the direction of the motor rotation may be achieved by connecting the contact (a) either to the contact (b) or to the contact (c).

In the above example, the position detectors are formed of the variable resistors 14, 15 and 16, respectively; however, they may be of the type in which a movable slit-board is provided in the seat proper 2 and the number of slits observed is detected for pulse counting. In this case, it is necessary that the memories 20, 21 and 22 are of the pulse-storing type.

Figure 3:
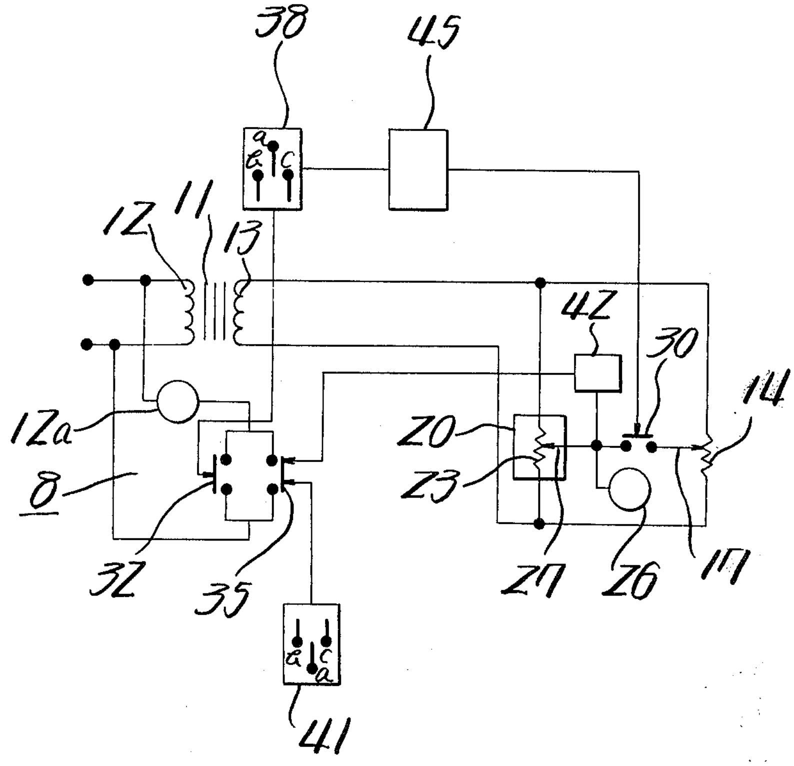
FIG. 3 is a circuit diagram of a modification of the presetting section.

As shown in FIG. 3, a control section 45 adapted to operate in response to signals generated when the manual control sections 38, 39 and 40 are turned off may be used as the presetting section, which closes the relays 30 for a predetermined period for presetting.

As is apparent from the foregoing description, the chair for dental treatment according to the present invention has the following effects and advantages:

Presetting may be made in one simple operation, since the seat proper can be stopped when it reaches the optimum treating position while its movement being visually confirmed. When presetting is once made, a very simple operation which momentarily manipulates the automatic control section can move the seat proper between the treating position and the original position; and therefore comfortable and efficient treatments can be performed.

Obviously many modifications and variations of the present invention are possible in the light of the above teachings. It is therefore to be understood that within the scope of the appended claim the invention may be practiced otherwise than as specifically described.

What is claimed as new and desired to be secured by Letters Patent in the United States is:

1. A chair for dental treatment comprising:

a seat having at least one movable part;

operating means for moving the movable part of the seat;

power means for driving the operating means;

a position detector for detecting the present position of the movable part of the seat;

means connected to the position detector for presetting the movable part of the seat to an optimum position;

a memory connected to the position detector for storing the optimum position of the movable part of the seat;

first actuatable control means for controlling the power means;

second actuatable control means for controlling the power means;

the power means including at least one motor coupled to said at least one movable part, normally open first switch means connected between the motor and the operating means and adapted to close when the first control means is activated, and second switch means connected across the first switch means between the motor and the operating means and adapted to close when the second control means is activated, said first and said second control means each having two operating modes by which the direction of rotation of said at least one motor is controlled, whereby it is correspondingly controlled by the direction of movement of said at least one movable part of said seat; and means for reading the optimum position of the movable part of the seat from the memory and opening the second switch means when the present position matches the optimum position.

* * * * *